(12) United States Patent
Baran Pouyan et al.

(10) Patent No.: US 12,554,973 B2
(45) Date of Patent: Feb. 17, 2026

(54) HIERARCHICAL DATA LABELING FOR MACHINE LEARNING USING SEMI-SUPERVISED MULTI-LEVEL LABELING FRAMEWORK

(71) Applicant: Accenture Global Solutions Limited, Dublin (IE)

(72) Inventors: Maziyar Baran Pouyan, Emeryville, CA (US); Mary A. Ohara, Newark, DE (US); Manish Khati, Hyderabad (IN); Srikant Vilas Khole, Pimpri Chinchwad (IN); Hrishikesh Satbhai, Pune (IN); Vivek Kumar Khetan, San Francisco, CA (US); Elena Stoyanova Eneva, Sunnyvale, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 842 days.

(21) Appl. No.: 17/820,419

(22) Filed: Aug. 17, 2022

(65) Prior Publication Data

US 2024/0062051 A1 Feb. 22, 2024

(51) Int. Cl.
*G06N 3/048* (2023.01)

(52) U.S. Cl.
CPC .................... *G06N 3/048* (2023.01)

(58) Field of Classification Search
CPC ........... G06N 20/20; G06N 5/01; G06N 3/048
See application file for complete search history.

(56) References Cited

U.S. PATENT DOCUMENTS

| | | | |
|---|---|---|---|
| 9,519,868 B2* | 12/2016 | Criminisi | G06N 20/00 |
| 10,936,658 B2* | 3/2021 | Wu | G06F 16/9024 |
| 2005/0189414 A1 | 9/2005 | Fano et al. | |
| 2019/0019061 A1 | 1/2019 | Trenholm et al. | |
| 2019/0147297 A1 | 5/2019 | Rogers et al. | |

(Continued)

OTHER PUBLICATIONS

Ying et al. Graph Convolutional Neural Networks for Web-Scale Recommender Systems [retrieved on Jul. 21, 2025] Retrieved from the Internet <URL:https://arxiv.org/abs/1806.01973> (Year: 2018).*

(Continued)

*Primary Examiner* — Michael J Huntley
*Assistant Examiner* — Alfredo Campos
(74) *Attorney, Agent, or Firm* — Mannava & Kang, P.C.

(57) ABSTRACT

Implementations are directed to receiving a plurality of data samples comprising a first set of data samples associated with respective labels and a second set of data samples to be labeled; generating a random forest structure comprising a set of decisions trees, each decision tree including nodes corresponding to the first set of data samples; adding the second set of data samples into each decision tree as additional nodes of each decision tree; merging the set of decision trees to obtain a universal graph, wherein each node corresponds to a data sample; extracting, using a graph embedding algorithm, an embedding feature for each data sample that corresponds to each node included in the universal graph; determining a distance between any pair of two data samples using respective embedding features of the two data samples; and determining a label for each of the second set of data samples using the distance.

14 Claims, 5 Drawing Sheets

(56) References Cited

U.S. PATENT DOCUMENTS

2021/0216813 A1 7/2021 Pouyan et al.
2021/0224584 A1 7/2021 Pouyan et al.

OTHER PUBLICATIONS

Pouyan MB, Nourani M. Clustering Single-Cell Expression Data Using Random Forest Graphs. IEEE J Biomed Health Inform. Jul. 2017;21(4):1172-1181. doi: 10.1109/JBHI.2016.2565561. Epub May 10, 2016. PMID: 28113735. (Year: 2016).*

X. Liu et al., "Semi-supervised Node Splitting for Random Forest Construction," 2013 IEEE Conference on Computer Vision and Pattern Recognition, Portland, OR, USA, 2013, pp. 492-499, doi: 10.1109/CVPR.2013.70. (Year: 2013).*

Zhihong Liu, Huiyu Li, Ruixin Li, Yong Zeng, and Jianfeng Ma. 2021. Graph Embedding Based on Euclidean Distance Matrix and its Applications. (Year: 2021).*

Qianmengke Zhao, Ye Wang, Qun Liu Multi-Semantic Image Recognition Model and Evaluating Index for explaining the deep learning models [retrieved on Jul. 21, 2025] Retrieved from the Internet <URL:https://arxiv.org/abs/2108.06871v1> (Year: 2021).*

Chenglin Fan and Ping Li. 2020. Classification Acceleration via Merging Decision Trees. In Proceedings of the 2020 ACM-IMS on Foundations of Data Science Conference (FODS '20). Association for Computing Machinery, New York, NY, USA, 13â22. https://doi.org/10.1145/3412815.3416886 (Year: 2020).*

Chenglin Fan and Ping Li. 2020. Classification Acceleration via Merging Decision Trees. In Proceedings of the 2020 ACM-IMS on Foundations of Data Science Conference (FODS '20). Association for Computing Machinery, New York, NY, USA, 13â22. https://doi.org/10.1145/3412815.3416886 (Year: 2021).*

Liu et al. IADA: Iterative Adversarial Data Augmentation Using Formal Verification and Expert Guidance [retrieved on Jul. 21, 2025] Retrieved from the Internet <URL:https://arxiv.org/abs/2108.06871v1> (Year: 2021).*

* cited by examiner

HIERARCHICAL DATA LABELING FOR MACHINE LEARNING USING SEMI-SUPERVISED MULTI-LEVEL LABELING FRAMEWORK

BACKGROUND

Machine learning is related to techniques that computer systems use to perform a specific task without using explicit instructions, relying on patterns and inference instead. Machine learning algorithms build a mathematical model based on sample data in order to make predictions or decisions without being explicitly programmed to perform the task.

In order to take advantage of the power of machine learning, a supervised training of a machine learning model can require a large amount of data that is appropriately labeled. For example, if a system is training a machine learning (ML) model that is to distinguish between images of cats and dogs, the training data should include images of cats and pictures of dogs. The system may also require that each image be labeled as to whether a cat or a dog is depicted in the image. When data sets grow in size and complexity, labeling the data sets can be challenging. The data labeling tasks can become even more challenging in instances where the data needs to be labeled with multiple labels of different levels.

SUMMARY

Implementations of the present disclosure are generally directed to a semi-supervised, multi-level labeling framework that automatically labels data to be used as training data for training one or more machine learning (ML) models. The labeling framework of the present disclosure can create multiple labels for each data sample that are in different levels. As described in further detail herein, implementations of the present disclosure provide time- and resource-efficiencies in providing labeled data for data samples in a set of training data.

More particularly, the labeling framework of the present disclosure applies a hybrid model including both a random forest model and a graph embedding model to label data. The techniques described in this specification reduce the computational complexity, and thus reduce the energy consumption and computational resources required for generating labels. In addition, the techniques described in this specification can use the label generated for each data sample as a feature that is descriptive of the data sample. The techniques described in this specification can use features of the data sample, including the label that has been added as a feature, to generate another label for the data sample in a next level. The techniques described in this specification can iteratively perform such a labeling process and generate labels at multiple levels.

In some implementations, actions include receiving a plurality of data samples comprising a first set of data samples associated with respective labels and a second set of data samples to be labeled; generating a random forest structure comprising a set of decisions trees, each decision tree including nodes corresponding to the first set of data samples; adding the second set of data samples into each decision tree as additional nodes of each decision tree; merging the set of decision trees of the random forest structure to obtain a universal graph, wherein each node of the universal graph corresponds to a data sample included in the plurality of data samples; extracting, using a graph embedding algorithm, an embedding feature for each data sample that corresponds to each node included in the universal graph; determining a distance between any pair of two data samples using respective embedding features of the two data samples; and determining a label for each of the second set of data samples using the distance. Other implementations of this aspect include corresponding systems, apparatus, and computer programs, configured to perform the actions of the methods, encoded on computer storage devices.

These and other implementations can each optionally include one or more of the following features, alone or in combination. In some implementations, the embedding feature for each data sample is in k dimension, wherein k is a number smaller than the number of data samples. In some implementations, the distance between any pair of two data samples is a standard Euclidean distance between the respective embedding features.

In some implementations, merging the set of decision trees comprises connecting the set of decision trees using shared vertices of the decision trees, wherein the shared vertices comprising roots and nodes connected to leaf nodes.

In some implementations, the actions include determining a labeling score indicating a quality of labels of the plurality of data samples; determining that the labeling score is less than a threshold; and sending the labels of the plurality of data samples to an administrative device.

In some implementations, the label for each data sample is in a first level, and the method further comprises determining a second label in a second level using feature vectors of each data sample and the label in the first level. In some implementations, the graph embedding algorithm includes a graph neural network (GNN).

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to a semi-supervised, multi-level labeling framework that automatically labels data to be used as training data for training one or more machine learning (ML) models. The labeling framework of the present disclosure can create multiple labels for each data sample that are in different levels. As described in further detail herein, implementations of the present disclosure provide time- and resource-efficiencies in providing labeled data for data samples in a set of training data.

More particularly, the labeling framework of the present disclosure applies a hybrid model including both a random forest model and a graph embedding model to label data. The techniques described in this specification reduce the computational complexity, and thus reduce the energy consumption and computational resources required for generating labels. In addition, the techniques described in this specification can use the label generated for each data sample as a feature that is descriptive of the data sample. The techniques described in this specification can use features of the data sample, including the label that has been added as a feature, to generate another label for the data sample in a next level. The techniques described in this specification can iteratively perform such a labeling process and generate labels at multiple levels.

In some implementations, actions include receiving a plurality of data samples comprising a first set of data samples associated with respective labels and a second set of data samples to be labeled; generating a random forest structure comprising a set of decisions trees, each decision tree including nodes corresponding to the first set of data samples; adding the second set of data samples into each decision tree as additional nodes of the decision tree; merging the set of decision trees of the random forest structure to obtain a universal graph, wherein each node of the universal graph corresponds to a data sample included in the plurality of data samples; extracting, using a graph embedding algorithm, an embedding feature for each data sample that corresponds to each node included in the universal graph; determining a distance between any pair of two data samples using respective embedding features of the two data samples; and determining a label for each of the second set of data samples using the distance.

Figure 1:
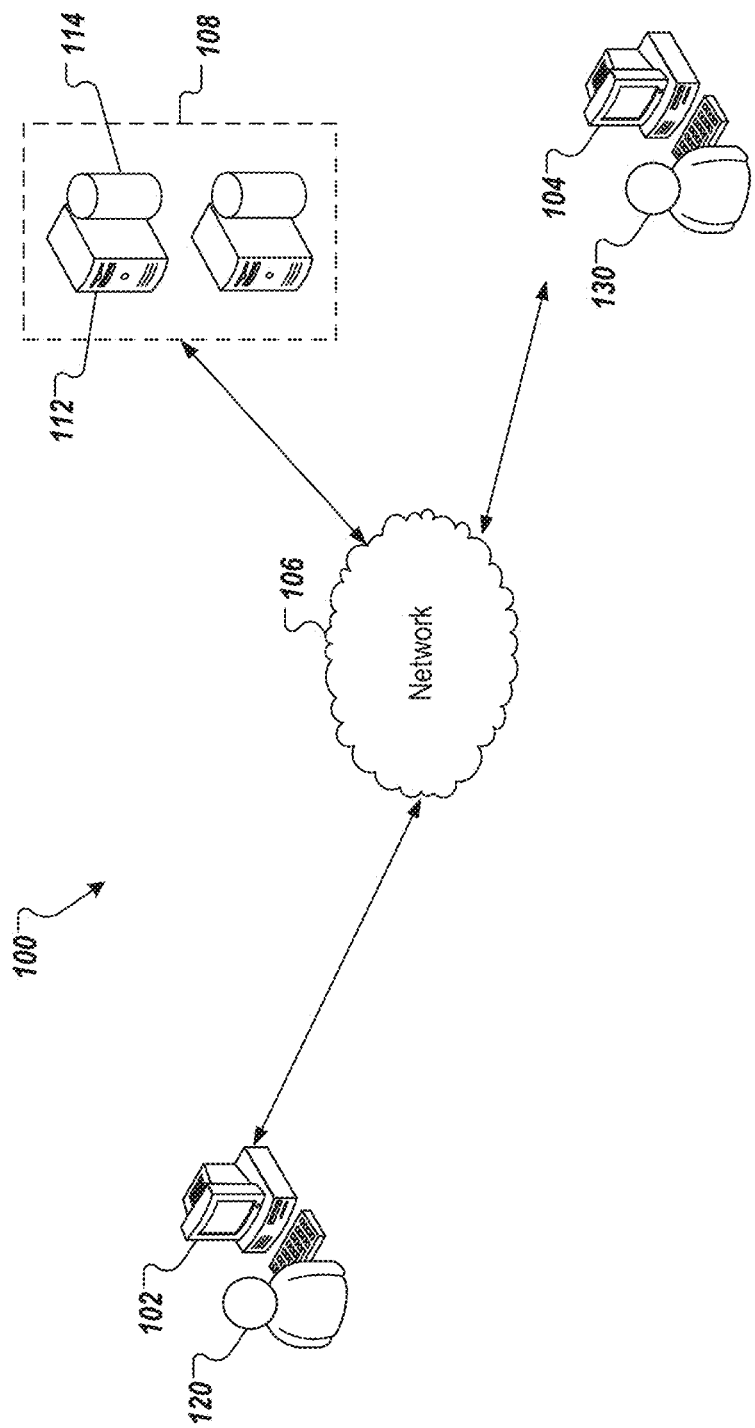
FIG. 1 depicts an example system that can execute implementations of the present disclosure.

FIG. 1 depicts an example system 100 that can execute implementations of the present disclosure. The example system 100 includes a user device 102, an administrative device 104, a back-end system 108, and a network 106. In some examples, the network 106 includes a local area network (LAN), wide area network (WAN), the Internet, or a combination thereof, and connects web sites, devices (e.g., the user device 102, the administrative device 104), and back-end systems (e.g., the back-end system 108). In some examples, the network 106 can be accessed over a wired and/or a wireless communication link.

In some examples, the user device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. The user device 102 can send a request to the system 108 over the network 106. The request can include a set of training data including a plurality of data samples to be labeled. The user 120 can be an individual, an organization, an enterprise, or any other entity that needs its unlabeled data set to be labeled.

Figure 2:
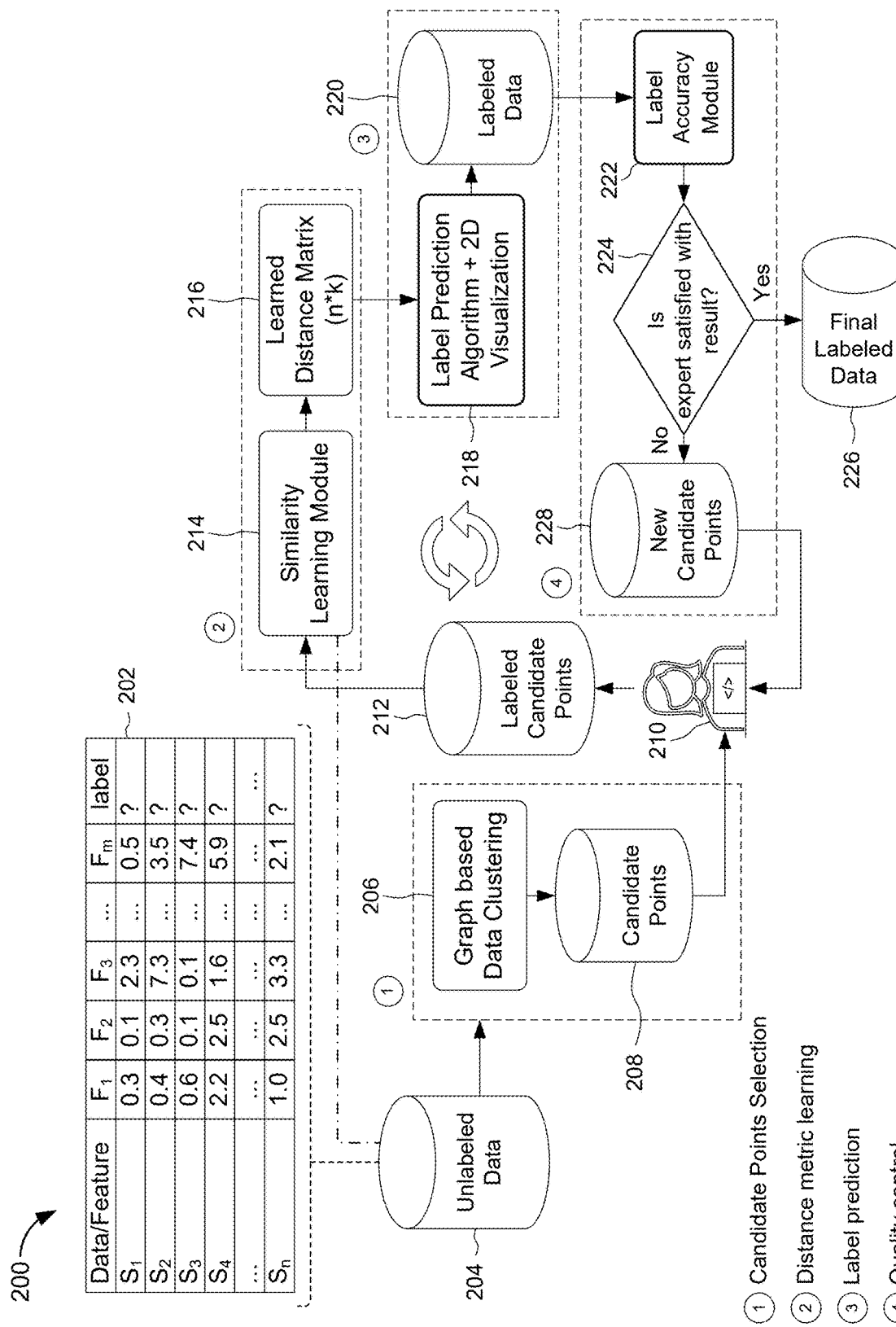
FIG. 2 depicts a representation of different stages of a labeling process in accordance with implementations of the present disclosure.

In some examples, the administrative device 104 can be any electronic device that is capable of communicating over the network 106. In some implementations, the administrative device 104 corresponds to an administrative user 130, such as an expert, that interacts with the back-end system 108 for providing labels or quality control. For example, the administrative user 130 can provide labels for a small portion of the plurality of data samples in the training data. The administrative user 130 can perform quality control after the plurality of data samples have been labeled. FIG. 2 and associated descriptions provide additional details of these implementations.

In the depicted example of FIG. 1, the back-end system 108 includes at least one server system 112, and data store 114 (e.g., database). In some examples, the at least one server system 112 hosts one or more computer-implemented services (e.g., labeling services) in accordance with implementations of the present disclosure. The back-end system 108 is also referred to as a labeling system or system.

The back-end system 108 can receive the request from the user device 102 that includes a plurality of data samples to be labeled. The back-end system 108 can select a small portion of the plurality of data samples as a set of candidate data samples based on a clustering method. For example, the back-end system may select 5%-10% of the plurality of data samples as the set of candidate data samples. The back-end system 108 can send the set of candidate data samples to the administrative device 104. The administrative user 130 can provide a respective label to each of the candidate data samples. The back-end system 108 can obtain the labeled candidate data samples from the administrative device 104 associated with the administrative user 130.

In a label prediction process, the back-end system 108 can use the labeled candidate data samples and perform a hybrid model that includes both a random forest model and a graph embedding model to predict the labels for the remaining unlabeled data samples in the plurality of data samples. As a result, all data samples in the training data are associated with a respective label.

After the back-end system 108 generates the labels for the plurality of data samples, the back-end system 108 can request the administrative user 130 to perform quality control. For example, the back-end system 108 can send the labels of the plurality of data samples to the administrative device 104 for further validation. The administrative user 130 can determine whether the labeled data are satisfactory. If the administrative user 130 is satisfied with the labels, the generated labels for the plurality of data samples are stored in a storage medium, such as the data store 114, as final labeled data samples. The back-end system 108 can return the labels of the plurality of data samples to the user device 102 over the network 106. If the administrative user 130 is not satisfied with the labels, the server can re-execute the labeling process for the plurality of data samples. In some examples, the back-end system 108 can iteratively execute the labeling process until the administrative user 130 is satisfied with generated labels. In some implementations, the back-end system 108 can perform hierarchical data labeling process to generate multiple labels for each data sample. The multiple labels can be in different levels. FIGS. 2-5 and associated descriptions provide additional details of these implementations.

In some examples, the server system 112 can store the plurality of data samples, the labels of the plurality of data samples in the data store 114. The server system 112 can also retrieve those data from the data store 114. The data store 114 can include any other information necessary for performing the functions described herein. For example, the data store 114 can store threshold values for configuring the labeling system and other parameters used in the quality control and selection of candidate data samples.

FIG. 2 depicts a representation of different stages of a labeling process 200 in accordance with implementations of the present disclosure. The labeling process 200 can be implemented by the back-end system 108 (e.g., labeling system) shown in FIG. 1. In some examples, the labeling process 200 is provided using one or more computer-executable programs executed by one or more computing devices.

The system can receive a data set including the plurality of data samples 202. The data set can be initially unlabeled training data 204. Each data sample can be a feature vector that includes multiple feature values. The feature value may be represented by a number or text. For example, each data sample can represent a customer. The feature vector of each customer can include values for the zip code field, the age field, and the income field. For instance, the feature vector for Customer A can include the zip code: 12345, the age field: twenty-three years old, and income field: an annual income of $50,000.

In the candidate data sample selection phase, the system can perform graph based data clustering 206 on the plurality of data samples that are unlabeled. After clustering the plurality of data samples, the system can select a set of candidate data samples 208 from the plurality of data samples. In some implementations, the system can select a small portion of the plurality of data samples as the set of candidate data samples 208. For example, the system may select 5%-10% of the plurality of data samples as the set of candidate data samples 208. The selected set of candidate data samples can be sent to a device associated an expert 210. The expert 210 can be the administrative user 130 in FIG. 1. The expert can provide a respective label to each of the candidate data samples.

In the graph based data clustering method 206, the system can cluster the plurality of data samples into multiple clusters. Each cluster is a population of nodes that are highly connected to each other. The nodes in the clusters correspond to the data samples in the data set. In some implementations, the system cluster the plurality of data samples using K-nearest neighbors algorithm (k-NN). For example, the system can model local neighborhood of each data sample by assigning a data sample to its "K" nearest neighbors using Euclidean distance metric.

After the plurality of data samples are grouped into multiple clusters, the system can select one or more most representative nodes of each cluster to form the set of candidate data samples. For example, the system can select the center of each cluster as the candidate data samples. In some implementations, the system can select, from each cluster, the nodes whose distance from the center of the cluster is within a threshold as the candidate data samples.

Figure 3:
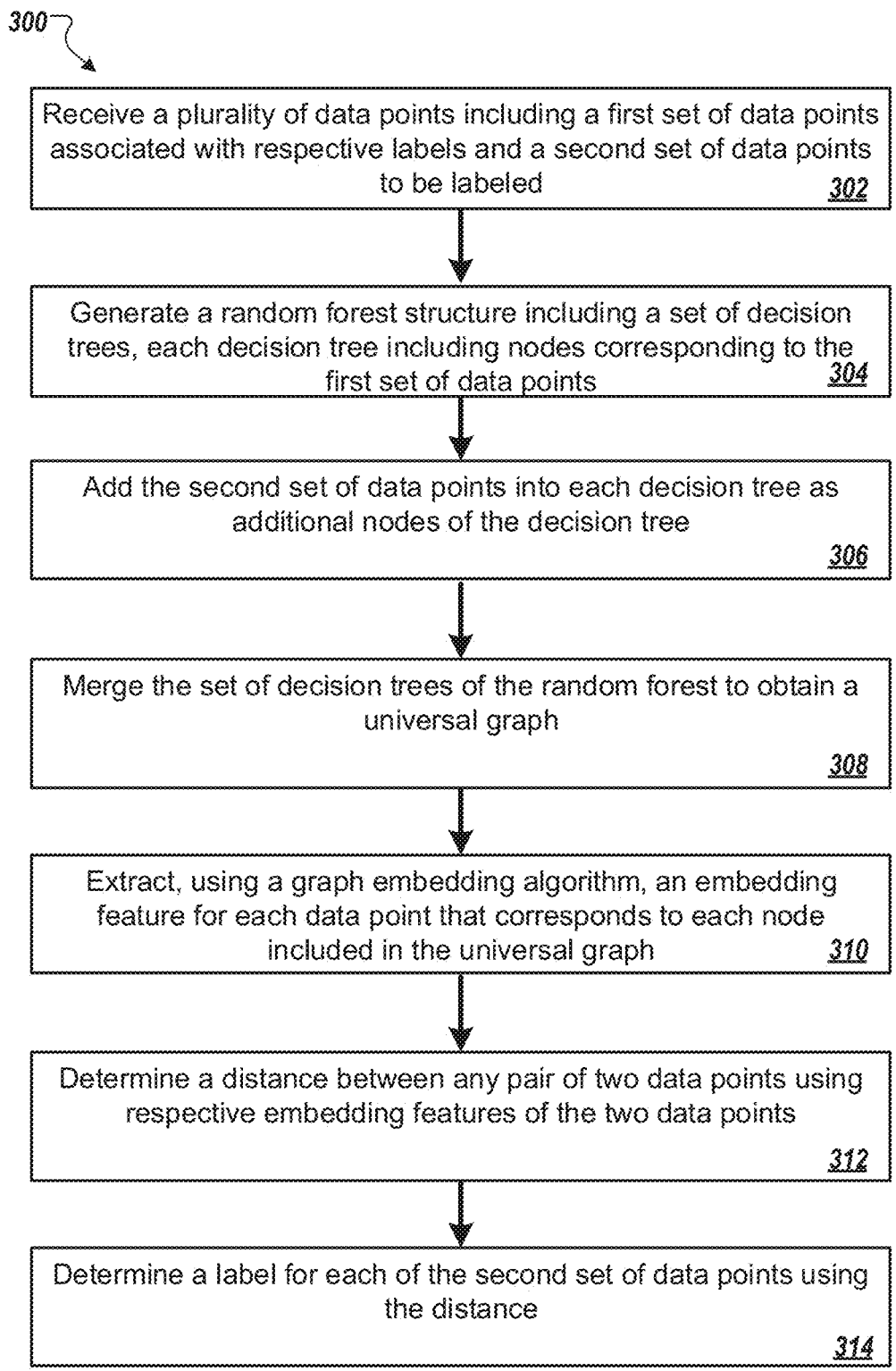
FIG. 3 depicts an example flow process of labeling data samples using a hybrid model that can be executed in accordance with implementations of the present disclosure.

As discussed above, the set of candidate data samples 208 can be labeled by an expert 210. As a result, the system can obtain the labeled candidate data samples 212 from the device associated with the expert 210. In the distance metric learning phase, the system can provide the labeled candidate data samples 212 to a similarity learning module 214. The similarity learning module 214 is configured to train a random forest classifier on the labeled candidate data samples to generate an ensemble of decision trees (e.g., a set of decision trees). The system can provide the remaining unlabeled data samples that were not included in the candidate labeled data samples to the set of decision trees. The system can provide each of the remaining unlabeled data samples to each decision tree, so that the remaining unlabeled data sample lands on a leaf node of the decision tree. The system can merge the set of decision trees to obtain a universal graph, and extract an embedding feature for each data sample using the graph structure and information. The system can determine a distance between any pair of two data samples using respective embedding features of the two data samples. The system can obtain a distance matrix D 216. The distance value included in the distance matrix D 216 is based on embedding features with n*k dimensions, where n is the number of data samples included in the plurality of data samples, k is a predetermined integer value that is smaller than n. The distance matrix can capture the semantic dissimilarity of the data samples. FIG. 3 and associated descriptions provide additional details of these implementations.

The system can generate another graph G' from the distance matrix. The graph G'={V, E} is the graph corresponding to the plurality of data samples where V={v1, v2, ..., vn} is the set of n vertices and E is a subset of V×V. E is the set of edges among the vertices of G'. In G', each vertex vi indicates a data sample xi in the plurality of data samples. The system can model the local neighbor of each data sample by assigning that point to its K nearest neighbors using semantic dissimilarity calculated as matrix D. As a result, the system can generate a new set of clusters for the plurality of data samples based on the semantic dissimilarity. Upon extraction of the graph G', the system can assign the labels in the labeled candidate data samples to the corresponding vertices.

In a label prediction phase, the system can perform a label propagation/prediction algorithm 218 to the graph G' to predict the labels for unlabeled data samples in G'. The label propagation algorithm may operate in semi-supervised mode, where an expert can assign a label to data samples in each cluster. In some implementations, the system can display, for the expert, the new set of clusters of the data samples in a two-dimensional (2D) visualization that in some cases can be generated using the label propagation/prediction algorithm 218. As a result, all of the data samples included in the plurality of data samples are associated with a respective label; and the plurality of data samples 202 become labeled data samples 220.

In a quality control phase, the system can determine a labeling score indicating a quality of labels of the plurality of data samples. The system can determine that the labeling score is less than a threshold. The system can send the labels of the plurality of data samples to an administrative device (e.g., an expert device for further validation). More specifically, the labeled data are provided to a label accuracy module 222 that accesses the quality of the labeling process. More specifically, the label accuracy module 222 can randomly select subsamples from the plurality of data samples, and apply the label propagation algorithm for a predetermined times (e.g., 50 times) to generate 50 labels for each data sample included in the subsamples. As a result, the label accuracy module can obtain a label set matrix L. Each row in L denotes a data sample in the subsamples, each column denotes one of the 50 labels. Thus, the size of the label set matrix L is n*50. The label accuracy module 222 can apply outlier detection algorithm, such as isolation forest, to the label set matrix L to calculate a labeling score for each data sample in the subsamples. The normalized average of the calculated scores can be used as the labeling score of the labeling process that indicates the quality of the labeling process.

Based on whether the labeling score of the labeling process satisfies a threshold, the system can send the labeled data samples to a device associated with an expert for further confirmation. For example, if the labeling score is less than a threshold, the system can send the labeled data samples to an administrative device (e.g., the expert device). The expert can determine whether the labeled data are satisfactory 224. If the expert is satisfied with the labels, the generated labels for the plurality of data samples are stored in a storage medium as final labeled data samples 226.

If the expert is not satisfied with the labels, the system can re-execute the labeling process for the plurality of data samples. For example, the system can regenerate a new set of candidate data samples 228 to be labeled by the expert 210. The system can execute the labeling process described above for the plurality of data samples based on the new set of candidate data samples 228 and their respective labels. The system can iteratively execute the labeling process until the expert is satisfied with generated labels. In some implementations, the system can iteratively execute the labeling process until the labeling score determined by the label accuracy module for the labeling process satisfies a threshold.

FIG. 3 depicts an example flow process 300 of labeling data samples using a hybrid model that can be executed in accordance with implementations of the present disclosure. The hybrid model includes a random forest model and a graph embedding model. The example process 300 can be implemented by the back-end system 108 (e.g., labeling system) shown in FIG. 1. In some examples, the example process 300 is provided using one or more computer-executable programs executed by one or more computing devices.

At step 302, the system can receive a plurality of data samples including two sets of data samples. The first set of data samples are associated with respective labels. The second set of data samples do not have labels yet and will be labeled.

As discussed above, the plurality of data samples can be originally unlabeled training data. The system can select a set of candidate data samples from the plurality of data samples. The selected set of candidate data samples can be labeled by an expert. The system can thus obtain the labeled candidate data samples. Such labeled candidate data samples can be the first set of data samples that are associated with respective labels. The remaining unlabeled data samples in the plurality of data samples can be the second set of data samples that will be labeled using the systems and methods described in this document.

At step 304, the system can generate a random forest structure including a set of decision trees. Each decision tree can include nodes corresponding to the first set of data samples. For example, the system can train a random forest classifier and generate a set of decision trees using the labeled candidate data samples.

Decision trees are a type of model used for both classification and regression. In a decision tree, each internal node (non-leaf node) can be a split point that denotes a test on an attribute or a feature. Each branch can represent an outcome of the test. Each leaf node (or terminal node) can hold a class label. The topmost node in a decision tree is the root node. The deduction process can start from the root node of a decision tree. The test condition on the root node is applied to a record or data sample. The deduction process can follow the appropriate branch based on the outcome of the test, which will lead either to another internal node, for which a new test condition is applied, or to a leaf node. The class label associated with the leaf node is then assigned to the record or the data sample.

A random forest structure can include a collection of decision trees whose results can be aggregated into one final result. In some implementations, the random forest can be generated by using a random subset of features of the training data. For example, the system can select a random subset of features as the features to be tested on the split points or internal nodes in a decision tree. The system can select another random subset of features as the features to be tested on the split points or internal nodes in another decision tree.

After generating the random forest structure, the system can apply each data sample in the first set of data samples to the logic of each decision tree. For example, the system can apply the test conditions of the internal nodes of each decision tree to the data sample, until the data sample landed on a leaf node. As a result, the system can train a random forest classifier and generate a set of decision trees that include the first set of data samples, e.g., the labeled candidate data samples.

At step 306, the system can add the second set of data samples into each decision tree as additional nodes of the decision tree. Specifically, the system can provide the remaining unlabeled data samples that were not included in the candidate labeled data samples to the set of decision trees. The system can provide each of the remaining unlabeled data samples to each decision tree, so that the remaining unlabeled data sample lands on a leaf node of the decision tree, when added to the decision tree.

At step 308, the system can merge the set of decision trees of the random forest to obtain a universal graph. Each node of the universal graph can correspond to a data sample included in the plurality of data sample.

The system can merge the set of decision tress by connecting the set of decision trees using shared vertices/nodes of the decision trees. The shared vertices/nodes can include the roots and nodes connected to leaf nodes (e.g., internal nodes). For example, the system can model each decision tree as an undirected graph $G_\theta=(V_\theta, E_\theta)$, where $V_\theta$ is the set of nodes included in the decision tree corresponding to graph $G_\theta$, $E_\theta$ is an undirected edge between two nodes. Assuming that there are T decision trees, the system can generate T undirected graphs $(G_1, G_2, \ldots G_\theta, \ldots G_T)$. The system can merge the T undirected graph to obtain the universal graph, which is also referred to as a universal random forest graph (RFG). The vertices/nodes in universal graph can correspond to the plurality of data samples.

At step 310, the system can extract, using a graph embedding algorithm, an embedding feature for each data sample that corresponds to each node included in the universal graph. In some implementations, the embedding feature for each data sample is in k dimension, where k is a number smaller than the number of data samples. In some examples, k<20.

In some implementations, the system can extract the embedding feature using a graph embedding algorithm that includes a graph neural network (GNN). In some implementations, the graph embedding can include a node2vector algorithm, such as LINE algorithms, that generate vector representations of nodes in a graph.

The graph embedding is an approach that is used to transform nodes, edges, and their features into vector space (a lower dimension) whilst maximally preserving properties like graph structure and information. Thus, by using the graph embedding algorithm, the system can extract the embedding feature that captures the semantic meaning of each data sample based on each node's relationships and neighboring nodes in the graph structure.

At step 312, the system can determine a distance between any pair of two data samples using respective embedding features of the two data samples. The distance can indicate the semantic dissimilarity between the two data samples. The distance between any pair of two data samples is a standard Euclidean distance between the respective embedding features.

After determining the distance between any pair of two data samples, the system can obtain a distance matrix D. The distance matrix can capture the semantic dissimilarity of any pair of data samples. The distance value included in the distance matrix D is based on embedding features with n*k dimensions, where n is the number of data samples included in the plurality of data samples, k is a predetermined integer value that is smaller than n.

Because k is a value much smaller than the number of data samples, the methods described in this specification can reduce the computation complexity for determining the distance matrix, as compared to determining a full distance matrix based on a random forest model only. In other words, by applying the hybrid model including both the random forest model and the graph embedding model, the methods described in this specification can reduce the energy consumption and computational resources required for determining the distance matrix.

At step 314, the system can determine a label for each of the second set of data samples using the distance.

As discussed above, the system can generate another graph G' from the distance matrix. The system can model the local neighbor of each data sample by assigning that data sample to its K nearest neighbors using the semantic dissimilarity calculated as matrix D. As a result, the system can generate a new set of clusters for the plurality of data samples based on the semantic dissimilarity.

The system can perform a label propagation/prediction algorithm to the graph G' to predict the labels for unlabeled data samples in G'. The label propagation algorithm may operate in semi-supervised mode, where an expert can assign a label to data samples in each cluster. As a result, all of the data samples included in the plurality of data samples are associated with a respective label.

The order of steps in the process 300 described above is illustrative only, and the process 300 can be performed in different orders. In some implementations, the process 300 can include additional steps, fewer steps, or some of the steps can be divided into multiple steps.

Figure 4:
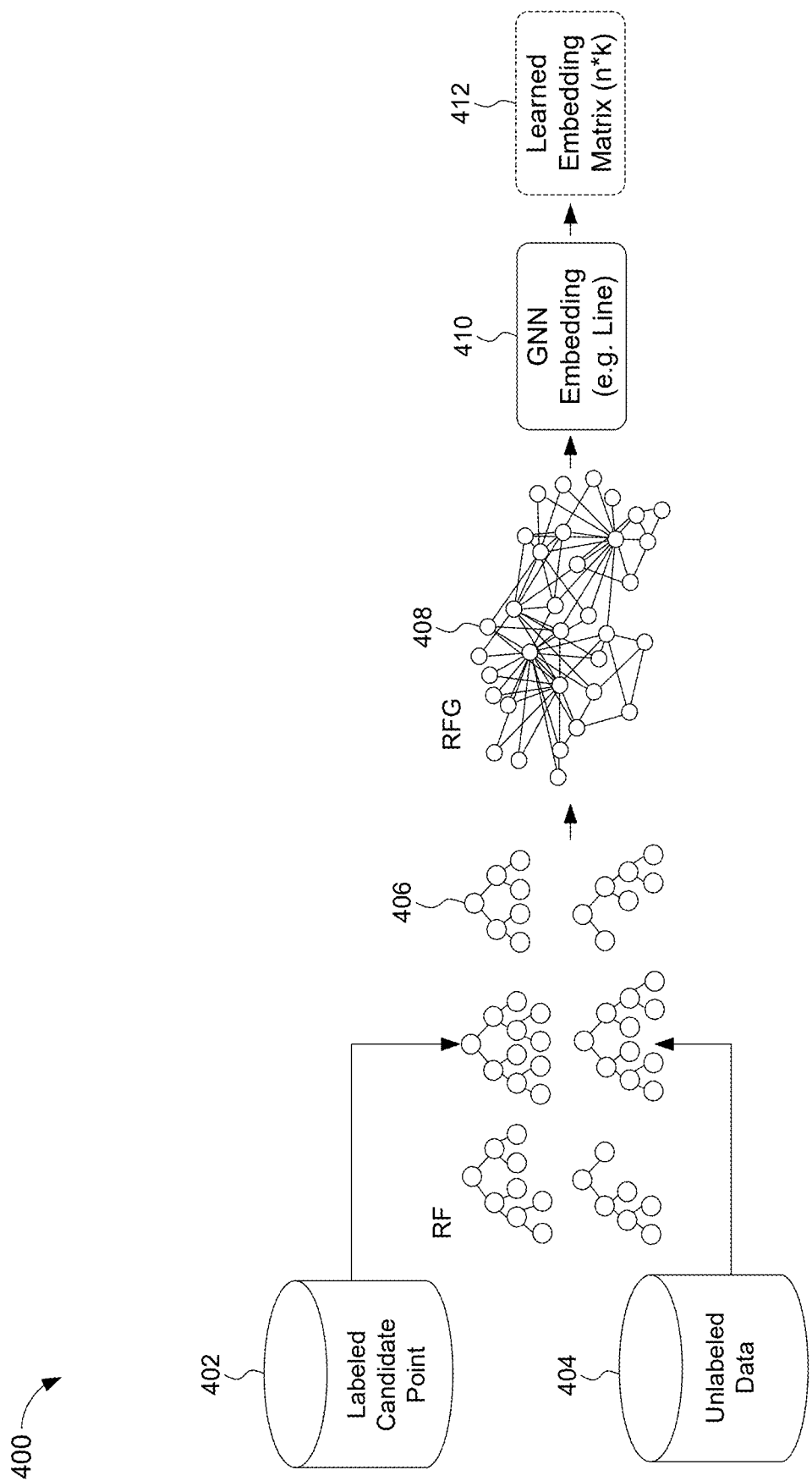
FIG. 4 depicts an example block process of labeling data samples using a hybrid model that can be executed in accordance with implementations of the present disclosure.

FIG. 4 depicts an example block process 400 of labeling data samples using a hybrid model, that can be executed in accordance with implementations of the present disclosure. The example process 400 can be implemented by the back-end system 108 (e.g., labeling system) shown in FIG. 1. In some examples, the example process 400 is provided using one or more computer-executable programs executed by one or more computing devices.

The system can receive a plurality of data samples including two sets of data samples. The first set of data samples are associated with respective labels (e.g., the labeled candidate data samples 402). The second set of data samples do not have labels yet and will be labeled (e.g., the remaining unlabeled data samples 404 that are included in the plurality of data samples, but not included in the labeled candidate data samples). The system can generate a random forest structure 406 including a set of decision trees. Each decision tree includes nodes corresponding to the labeled candidate data samples 402. The system can add the remaining unlabeled data samples 404 into each decision tree, so that the remaining unlabeled data samples land on leaf nodes of the decision trees. The system can merge the set of decision trees to obtain a universal graph 408, also referred to as a universal random forest graph (RFG). Each node of the universal graph 408 can correspond to a data sample included in the plurality of data sample. The system can extract an embedding feature for each data sample (e.g., each node in the universal graph) using a graph embedding algorithm 410. The graph embedding algorithm can include a graph neural network (GNN). In some implementations, the graph embedding can include a node2vector algorithm, such as LINE algorithms, that generate vector representations of nodes in a graph. The system can determine a distance 412 between any pair of two data samples using respective embedding features of the two data samples to obtain a distance matrix D. The distance value included in the distance matrix D is based on embedding features with n*k dimensions, where n is the number of data samples included in the plurality of data samples, k is a predetermined integer value that is smaller than n.

Figure 5:
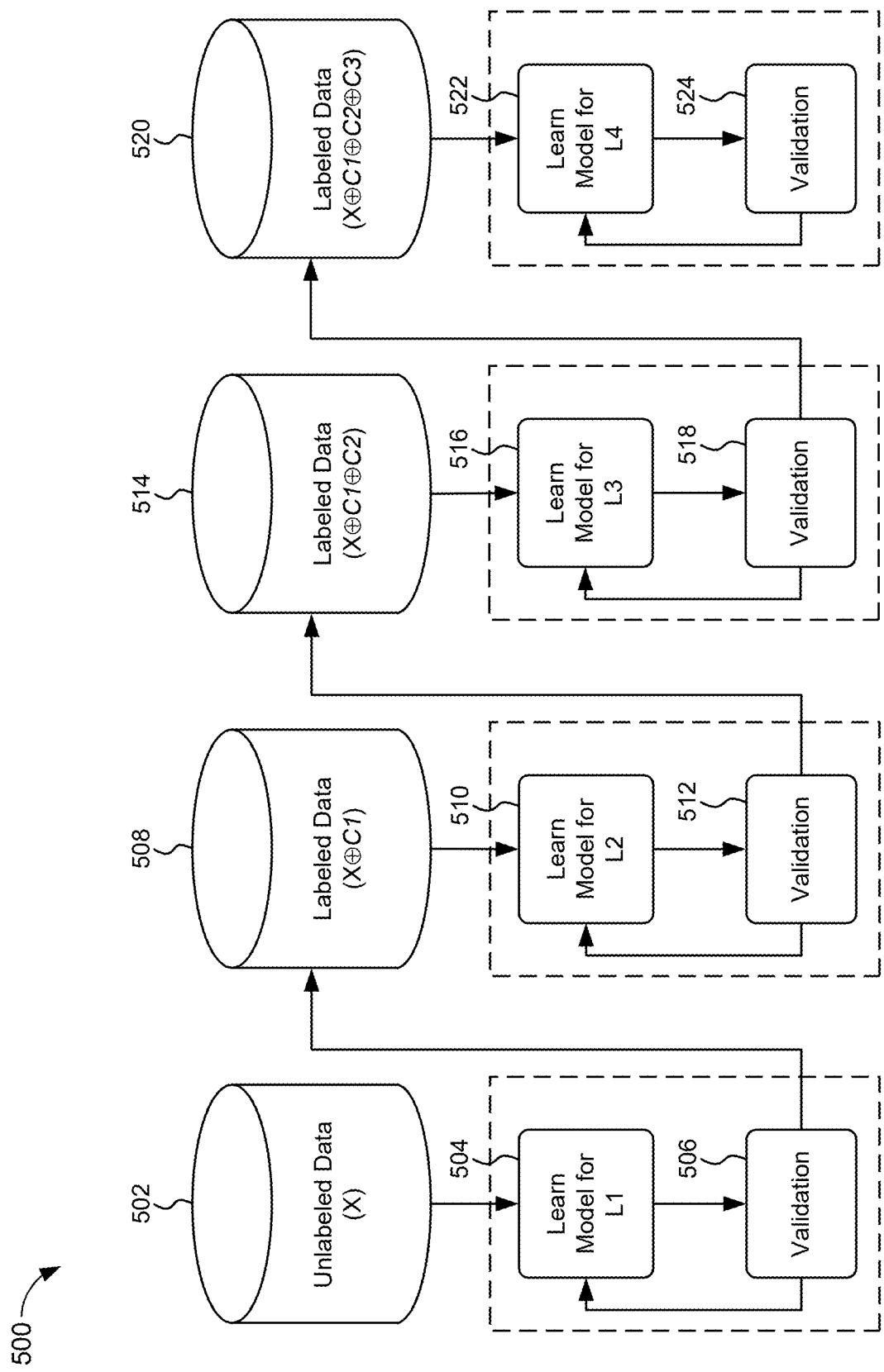
FIG. 5 depicts an example process of labeling data samples in multiple levels that can be executed in accordance with implementations of the present disclosure.

FIG. 5 depicts an example process 500 of labeling data samples in multiple levels that can be executed in accordance with implementations of the present disclosure. The example process 500 can be implemented by the back-end system 108 (e.g., labeling system) shown in FIG. 1. In some examples, the example process 500 is provided using one or more computer-executable programs executed by one or more computing devices.

The labels discussed above are in a first level. In some implementations, each data sample can be associated with more than one label. For example, in text categorization, a document can belong to several topics simultaneously. In such multi-label cases, the system can perform hierarchical data labeling process to generate multiple labels for each data sample. The multiple labels can be in different levels. The system can determine a second label in a second level using feature vectors of each data sample and the label in the first level.

As shown in FIG. 5, each data sample X from the original unlabeled data 502 can be labeled with a first level label C1 using the methods (e.g., learning model 504) discussed above. In a validation process 506, the first level label C1 can be validated by an expert. In some examples, the validation process 506 can determine that the labeling score of the first level label C1 satisfies a threshold. After validation 506, the first level label C1 can be added as a new feature of the data sample X. The system can provide the original features of the data sample X and the first level new feature C1 (e.g., (X+C1)) 508 to the learning model. The learning model 510 can use such information to generate a second level label C2. The system can iteratively perform such a labeling process and generate labels in higher levels.

For example, after validating the second level label C2 512, the second level label C2 can be added as another new feature of the data sample X. The system can provide the original features of the data sample X, the first level new feature C1, and the second level new feature C2 (e.g., (X+C1+C2)) 514, to the learning model. The learning model 516 can obtain a third level label C3.

After validating the third level label C3 518, the third level label C3 can be added as another new feature of the data sample X. The system can provide the original features of the data sample X, the first level new feature C1, the second level new feature C2, and the third level new feature C3 (e.g., (X+C1+C2_C3)) 520 to the learning model. The learning model 522 can obtain a fourth level label C4, which can be validated 524.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on one or more non-transitory computer readable storage media for execution by, or to control the operation of, data processing apparatus). The non-transitory computer readable storage medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
receiving a plurality of data samples comprising a first set of data samples associated with respective labels and a second set of data samples to be labeled;
generating, by a labeling system, a random forest structure comprising a set of decision trees, each decision tree including nodes corresponding to the first set of data samples;
adding, by the labeling system, the second set of data samples into each decision tree as additional nodes of each decision tree such that each data sample lands on a leaf node of the decision tree;
merging the set of decision trees of the random forest structure to obtain a universal random-forest graph (RFG), wherein each node of the RFG corresponds to a respective one of the plurality of data samples, wherein merging comprises connecting the decision trees at shared vertices including roots and nodes connected to leaf nodes;
extracting, using a graph embedding algorithm, an embedding feature for each data sample that corresponds to each node included in the RFG,
wherein:
the graph embedding algorithm comprising a graph neural network (GNN) or a node-to-vector algorithm, and
the embedding feature being k-dimensional where k is less than a number of the plurality of data samples;
determining a distance between any pair of two data samples using respective embedding features of the two data samples based on computing a distance matrix, wherein distance between any pair of the two data samples in the distance matrix are Euclidean distances between respective pairs of the embedding features; and
determining a label for each of the second set of data samples by performing graph-based label propagation over a neighborhood graph constructed from the distance matrix,
thereby reducing computational complexity and energy consumption relative to computing full pairwise distances using the random forest.

2. The computer-implemented method of claim 1, wherein the embedding feature for each data sample is in k dimension, wherein k is a number smaller than 20.

3. The computer-implemented method of claim 1, further comprising:
determining a labeling score indicating a quality of labels of the plurality of data samples, wherein determining the labeling score comprises applying an isolation-forest outlier-detection algorithm to a label set matrix generated from multiple label-propagation runs;
determining that the labeling score is less than a threshold; and
sending the labels of the plurality of data samples to an administrative device.

4. The computer-implemented method of claim 1, wherein the label for each data sample is in a first level, and the method further comprises adding the first-level label as a new feature to the feature vector and determining a second label in a second level using an augmented feature vector.

5. The computer-implemented method of claim 1, wherein the graph embedding algorithm comprises a graph neural network (GNN).

6. One or more non-transitory computer-readable storage media coupled to one or more processors and having instructions stored thereon which, when executed by the one or more processors, cause the one or more processors to perform operations comprising:
receiving a plurality of data samples comprising a first set of data samples associated with respective labels and a second set of data samples to be labeled;
generating, by a labeling system, a random forest structure comprising a set of decisions trees, each decision tree including nodes corresponding to the first set of data samples;
adding, by the labeling system, the second set of data samples into each decision tree as additional nodes of each decision tree such that each data sample lands on a leaf node of the decision tree;
merging the set of decision trees of the random forest structure to obtain a universal random-forest graph (RFG), wherein each node of the RFG corresponds to a respective one of the plurality of data samples, wherein merging comprises connecting the decision trees at shared vertices including roots and nodes connected to leaf nodes;
extracting, using a graph embedding algorithm, an embedding feature for each data sample that corresponds to each node included in the RFG;
wherein:
the graph embedding algorithm comprising a graph neural network (GNN) or a node-to-vector algorithm, and
the embedding feature being k-dimensional where k is less than a number of the plurality of data samples;
determining a distance between any pair of two data samples using respective embedding features of the two data samples based on computing a distance matrix, wherein distance between any pair of the two data samples in the distance matrix are Euclidean distances between respective pairs of the embedding features; and
determining a label for each of the second set of data samples by performing graph-based label propagation over a neighborhood graph constructed from the distance matrix,
wherein the foregoing operations are automatically executed by the labeling system to reduce computational complexity and energy consumption relative to computing full pairwise distances using the random forest.

7. The one or more non-transitory computer-readable storage media of claim 6, wherein the embedding feature for each data sample is in k dimension, wherein k is a number smaller than 20.

8. The one or more non-transitory computer-readable storage media of claim 6, wherein the operations further comprise:
determining a labeling score indicating a quality of labels of the plurality of data samples, wherein determining the labeling score comprises applying an isolation-forest outlier-detection algorithm to a label set matrix generated from multiple label-propagation runs;
determining that the labeling score is less than a threshold; and
sending the labels of the plurality of data samples to an administrative device.

9. The one or more non-transitory computer-readable storage media of claim 6, wherein the label for each data sample is in a first level, and the operations further comprises adding the first-level label as a new feature to the feature vector and determining a second label in a second level using an augmented feature vector.

10. The one or more non-transitory computer-readable storage media of claim 6, wherein the graph embedding algorithm comprises a graph neural network (GNN).

11. A system, comprising:
one or more processors; and
a computer-readable storage device coupled to the one or more processors and having instructions stored thereon which, when executed by the one or more processors, cause the one or more processors to perform operations comprising:
receiving a plurality of data samples comprising a first set of data samples associated with respective labels and a second set of data samples to be labeled;
generating, by a labeling system, a random forest structure comprising a set of decisions trees, each decision tree including nodes corresponding to the first set of data samples;
adding, by the labeling system, the second set of data samples into each decision tree as additional nodes of each decision tree such that each data sample lands on a leaf node of the decision tree;
merging the set of decision trees of the random forest structure to obtain a universal random-forest graph (RFG), wherein each node of the RFG corresponds to a respective one of the plurality of data samples, wherein merging comprises connecting the decision trees at shared vertices including roots and nodes connected to leaf nodes;
extracting, using a graph embedding algorithm, an embedding feature for each data sample that corresponds to each node included in the RFG,
wherein:
the graph embedding algorithm comprising a graph neural network (GNN) or a node-to-vector algorithm, and
the embedding feature being k-dimensional where k is less than a number of the plurality of data samples;
determining a distance between any pair of two data samples using respective embedding features of the two data samples based on computing a distance matrix, wherein distance between any pair of the two data samples in the distance matrix are Euclidean distances between respective pairs of the embedding features; and
determining a label for each of the second set of data samples by performing graph-based label propagation over a neighborhood graph constructed from the distance matrix,
wherein the foregoing operations are automatically executed by the labeling system to reduce computational complexity and energy consumption relative to computing full pairwise distances using the random forest.

12. The system of claim 11, wherein the embedding feature for each data sample is in k dimension, wherein k is a number smaller than the 20.

13. The system of claim 11, wherein the operations further comprise:
determining a labeling score indicating a quality of labels of the plurality of data samples, wherein determining the labeling score comprises applying an isolation-forest outlier-detection algorithm to a label set matrix generated from multiple label-propagation runs;
determining that the labeling score is less than a threshold; and
sending the labels of the plurality of data samples to an administrative device.

14. The system of claim 11, wherein the label for each data sample is in a first level, and the operations further comprises adding the first-level label as a new feature to the feature vector and determining a second label in a second level using an augmented feature vector, and wherein the graph embedding algorithm comprises a graph neural network (GNN).

* * * * *